US008736716B2

(12) United States Patent
Prentice

(10) Patent No.: US 8,736,716 B2
(45) Date of Patent: May 27, 2014

(54) DIGITAL CAMERA HAVING VARIABLE DURATION BURST MODE

(75) Inventor: Wayne E. Prentice, Honeoye Falls, NY (US)

(73) Assignee: Apple Inc., Cupertino, CA (US)

(*) Notice: Subject to any disclaimer, the term of this patent is extended or adjusted under 35 U.S.C. 154(b) by 537 days.

(21) Appl. No.: 13/080,734

(22) Filed: Apr. 6, 2011

(65) Prior Publication Data

US 2012/0257071 A1 Oct. 11, 2012

(51) Int. Cl.
*H04N 5/76* (2006.01)
*H04N 5/225* (2006.01)

(52) U.S. Cl.
USPC .................................. 348/231.9; 348/220.1

(58) Field of Classification Search
USPC ............. 348/220.1, 231.9, 362, 294, 305, 36, 348/48, 169, 208.14, 221.1
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daley et al. | |
| 5,016,107 A | 5/1991 | Sasson et al. | |
| 5,140,434 A | 8/1992 | Van Blessinger | |
| 5,189,511 A | 2/1993 | Parulski et al. | |
| 5,196,938 A | 3/1993 | Blessinger | |
| 5,493,335 A | 2/1996 | Parulski et al. | |
| 5,598,237 A | 1/1997 | McIntyre | |
| 5,652,621 A | 7/1997 | Adams, Jr. | |
| 5,668,597 A | 9/1997 | Parulski et al. | |
| 5,929,919 A | 7/1999 | DeHaan et al. | |
| 6,192,162 B1 | 2/2001 | Hamilton, Jr. et al. | |
| 6,282,317 B1 | 8/2001 | Luo et al. | |
| 6,292,218 B1 | 9/2001 | Parulski et al. | |
| 6,539,169 B1 | 3/2003 | Tsubaki et al. | |
| 6,885,395 B1 * | 4/2005 | Rabbani et al. | 348/231.1 |
| 6,934,056 B2 | 8/2005 | Gindele et al. | |

(Continued)

FOREIGN PATENT DOCUMENTS

| | | |
|---|---|---|
| EP | 1486928 | 12/2004 |
| EP | 2139226 | 12/2009 |
| JP | 2004 260717 | 9/2004 |

OTHER PUBLICATIONS

Aroh Barjatya, "Block matching algorithms for motion estimation" IEEE Digital Image Process 6620, pp. 1-6 (2004).

(Continued)

*Primary Examiner* — Ahmed A Berhan
(74) *Attorney, Agent, or Firm* — Wong, Cabello, Lutsch, Rutherford & Brucculeri, LLP

(57) ABSTRACT

A digital camera for having a variable time duration burst capture mode, comprising: an image sensor; an optical system; a data processing system; a frame buffer memory; and a program memory. The program memory stores instructions including: specifying a first frame rate; initiating an image capture sequence; storing a sequence of digital images captured at the first frame rate in the frame buffer memory; determining whether the frame buffer memory has been filled to a predetermined capacity. If the frame buffer memory has been filled to the predetermined capacity, the program memory further includes instructions for specifying a second frame rate, wherein the second frame rate is lower than the first frame rate; designating a set of stored digital images that can be overwritten; and storing a sequence of digital images captured at the second frame rate in the frame buffer memory, overwriting the designated set of stored digital images.

19 Claims, 9 Drawing Sheets

(56) References Cited

U.S. PATENT DOCUMENTS

| | | | |
|---|---|---|---|
| 7,024,054 B2 | 4/2006 | Cahill et al. | |
| 7,542,077 B2 | 6/2009 | Miki | |
| 7,546,026 B2 | 6/2009 | Pertsel | |
| 7,657,164 B2 | 2/2010 | Nomura | |
| 7,720,376 B2 | 5/2010 | Weinberg | |
| 7,755,667 B2 | 7/2010 | Rabbani | |
| 8,164,651 B2 | 4/2012 | Hamilton, Jr. | |
| 8,319,859 B2 * | 11/2012 | Kim et al. | 348/231.99 |
| 8,379,934 B2 | 2/2013 | Jasinski | |
| 2002/0080881 A1 | 6/2002 | Honda | |
| 2004/0075750 A1 * | 4/2004 | Bateman | 348/231.1 |
| 2005/0128343 A1 | 6/2005 | Murata | |
| 2005/0191729 A1 | 9/2005 | Kaczmarek | |
| 2005/0212912 A1 * | 9/2005 | Huster | 348/155 |
| 2007/0024931 A1 | 2/2007 | Compton et al. | |
| 2007/0092244 A1 | 4/2007 | Pertsel | |
| 2007/0188617 A1 | 8/2007 | Stavely | |
| 2007/0236567 A1 | 10/2007 | Pillman | |
| 2007/0237506 A1 | 10/2007 | Minema | |
| 2007/0237514 A1 | 10/2007 | Pillman et al. | |
| 2007/0248330 A1 | 10/2007 | Pillman | |
| 2008/0024619 A1 | 1/2008 | Ono | |
| 2008/0094498 A1 | 4/2008 | Mori | |
| 2008/0298795 A1 | 12/2008 | Kuberka | |
| 2009/0040364 A1 | 2/2009 | Rubner | |
| 2009/0128647 A1 | 5/2009 | Fahn | |
| 2009/0237527 A1 | 9/2009 | Mizuno et al. | |
| 2009/0244301 A1 | 10/2009 | Border | |
| 2009/0295931 A1 | 12/2009 | Cho | |
| 2010/0208087 A1 | 8/2010 | Ogawa | |
| 2011/0043639 A1 * | 2/2011 | Yokohata | 348/169 |
| 2012/0243802 A1 | 9/2012 | Fintel | |

OTHER PUBLICATIONS

International Search Report and Written Opinion in corresponding PCT Application No. PCT/US2012/023287, dated Jul. 27, 2012.
International Search Report and Written Opinion in corresponding PCT Application No. PCT/US2012/028683, dated Jul. 27, 2012.
Suh et al., "Fast sub-pixel motion estimation techniques having lower computational complexity," IEEE Transactions Consumer Electronics, vol. 50, pp. 968-973 (2004).

* cited by examiner

FIG. 5A

| FRAME NUMBER | CAPTURE TIME | SEQUENCE NUMBER |
|---|---|---|
| 1 | 0 | 1 |
| 2 | ΔT | 2 |
| 3 | 2ΔT | 3 |
| 4 | 3ΔT | 4 |
| 5 | 4ΔT | 5 |
| 6 | 5ΔT | 6 |
| 7 | 6ΔT | 7 |
| 8 | 7ΔT | 8 |

FIG. 5B

| FRAME NUMBER | CAPTURE TIME | SEQUENCE NUMBER |
|---|---|---|
| 1 | 0 | 1 |
| 2 | OPEN | |
| 3 | 2ΔT | 2 |
| 4 | OPEN | |
| 5 | 4ΔT | 3 |
| 6 | OPEN | |
| 7 | 6ΔT | 4 |
| 8 | OPEN | |

FIG. 5C

| FRAME NUMBER | CAPTURE TIME | SEQUENCE NUMBER |
|---|---|---|
| 1 | 0 | 1 |
| 2 | 8ΔT | 5 |
| 3 | 2ΔT | 2 |
| 4 | 10ΔT | 6 |
| 5 | 4ΔT | 3 |
| 6 | 12ΔT | 7 |
| 7 | 6ΔT | 4 |
| 8 | 14ΔT | 8 |

FIG. 5D

| FRAME NUMBER | CAPTURE TIME | SEQUENCE NUMBER |
|---|---|---|
| 1 | 0 | 1 |
| 2 | 8ΔT | 3 |
| 3 | OPEN | |
| 4 | OPEN | 2 |
| 5 | 4ΔT | 2 |
| 6 | 12ΔT | 4 |
| 7 | OPEN | |
| 8 | OPEN | |

FIG. 5E

| FRAME NUMBER | CAPTURE TIME | SEQUENCE NUMBER |
|---|---|---|
| 1 | 0 | 1 |
| 2 | 8ΔT | 3 |
| 3 | 16ΔT | 5 |
| 4 | 20ΔT | 6 |
| 5 | 4ΔT | 2 |
| 6 | 12ΔT | 4 |
| 7 | 24ΔT | 7 |
| 8 | 28ΔT | 8 |

| FRAME NUMBER | CAPTURE TIME | SEQUENCE NUMBER |
|---|---|---|
| 1 | 0 | 1 |
| 2 | $\Delta T$ | 2 |
| 3 | $2\Delta T$ | 3 |
| 4 | $3\Delta T$ | 4 |
| 5 | $5\Delta T$ | 5 |
| 6 | $7\Delta T$ | 6 |
| 7 | $11\Delta T$ | 7 |
| 8 | $15\Delta T$ | 8 |

*FIG. 6*

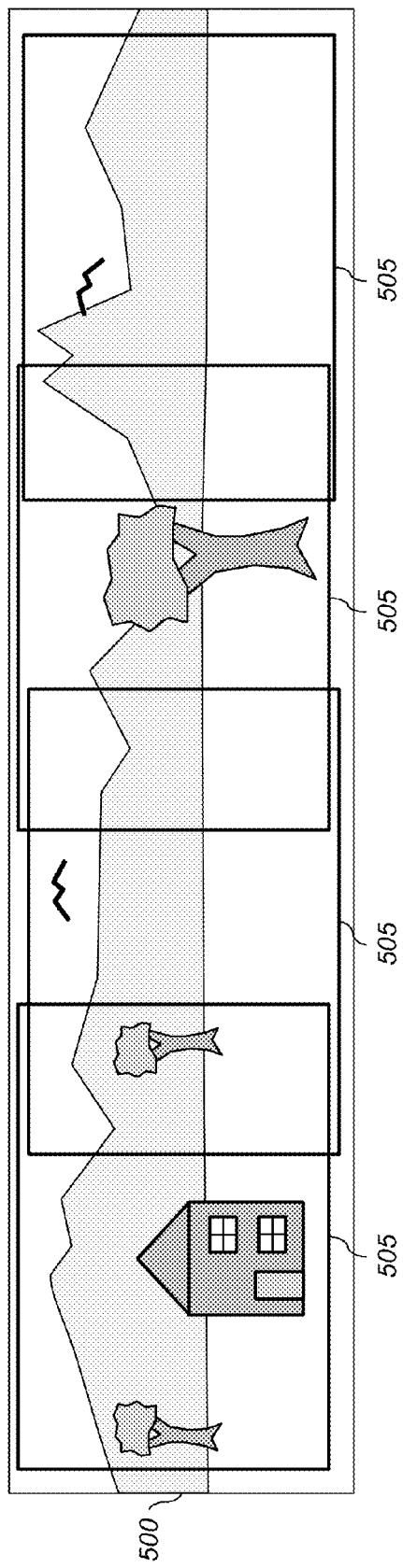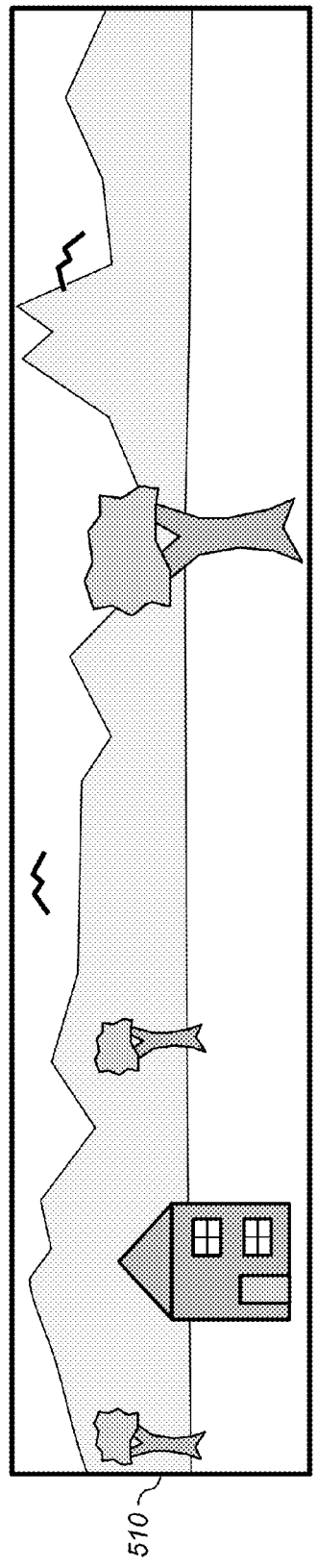

DIGITAL CAMERA HAVING VARIABLE DURATION BURST MODE

CROSS-REFERENCE TO RELATED APPLICATIONS

Reference is made to commonly-assigned U.S. Pat. No. 8,428,308, entitled "Estimating subject motion for capture setting determination," by Jasinski et al.; and to commonly assigned U.S. Pat. No. 8,379,934, entitled "Estimating subject motion between image frames," by Jasinski et al., and to commonly-assigned, co-pending U.S. patent application Ser. No. 13/071,585, entitled "Digital camera having burst capture mode," by Fintel et al.; and to commonly-assigned, co-pending U.S. patent application Ser. No. 13/071,615, entitled "Digital camera for capturing an image sequence," by Fintel et al., each of which is incorporated herein by reference. In addition, U.S. patent application Ser. No. 13/071,595, now abandoned, entitled "Composite image formed from an image sequence," by Fintel et al. is incorporated herein by reference.

FIELD OF THE INVENTION

This invention pertains to the field of digital imaging, and more particularly to a method for managing buffer memory for a digital camera having a burst image capture mode.

BACKGROUND OF THE INVENTION

Digital camera devices have continued to increase in complexity and capabilities with the advent of new image capture modes that offer the user unique output image characteristics. One such image capture mode is a composite burst image capture mode where a plurality of images are acquired over a specified time interval and one or more subjects in the scene are extracted from multiple images and combined onto a common background. The resulting composite image provides a stop action effect for the subject in motion as illustrated in FIG. 1A. As a creative mode, this capability enables the user to observe the motion of a skier, the running of a child or any other conditions where subject motion allows for a proper stop-action effect.

A key consideration of the composite burst image mode is the proper selection of the time separation between individual captures that are combined into the single composite image. Currently, for typical embodiments of this image capture mode, various image capture settings (e.g., the number of "burst" images and, either the total time duration for the image sequence or the time spacing between sequential image captures) must be specified via a user interface prior to the user capturing the moment of action. This requires the user to make a guess about the appropriate image capture settings prior to initiating the capture of the sequence of images. Given that knowledge about the motion of the moving objects will be rarely known in advance, this can lead to unsatisfactory results in many cases. This can be further complicated by the fact that the user may forget to adjust the image capture settings before the capture of new conditions. An example of an unsatisfactory result would correspond to the subject moving too slowly relative to the capture rate, resulting in too little separation between the object positions in the resulting composite image as illustrated in FIG. 1B. An analogous problem would occur when the subject is moving too rapidly relative to the capture rate so that it moves too quickly through the camera's field of view. Both of these examples would result in a poor user experience of the resulting output composite image.

Some recently introduced digital cameras include a capability to automatically analyze captured images to determine the motion characteristics present within the image content of interest. The motion characteristics are used for purposes such as determining the optimal exposure time.

Various methods of estimating motion are available to those skilled in the art, the most common of which is to capture two images separated in time and measure the change in spatial location of objects between frames. One such method is described by De Haan in U.S. Pat. No. 5,929,919, entitled "Motion-compensated field rate conversion."

U.S. Patent Application Publication 2007/0237514 to Pillman et al., entitled "Varying camera self-determination based on subject motion," teaches a method for capturing digital images where motion in the scene is measured prior to image capture. Various camera settings are adjusted responsive to the determined scene motion.

Capturing a rapid burst of digital images requires a means to buffer the captured image data. Managing a limited amount of memory in a digital camera can present some challenging problems. U.S. Pat. No. 5,016,107 to Sasson et al., entitled "Electronic still camera utilizing image compression and digital storage" teaches a digital camera including a multi-frame image buffer for storage of a burst of digital images. As each digital image is captured, the next available buffer area is loaded and image compression begins. When the image buffer is filled, a control processor interrupts the exposure section so that no further images are captured until an image buffer area is freed.

U.S. Pat. No. 6,885,395 to Rabbani et al., entitled "Selectively adjusting the resolution levels or the quality levels of digital images stored in a digital camera memory," discloses a digital camera where the resolution level or quality level of stored digital images is adjusted based on the available memory space in the digital camera memory so that a subsequent captured digital image can be stored.

U.S. Pat. No. 6,539,169 to Tsubaki et al., entitled "Method and apparatus for recording and re-recording image data in a device having limited memory capacity," discloses a digital camera having a limited memory capacity. Digital images are initially recorded a predetermined resolution or compression rate. An image file is then read from the memory and re-recorded after a resolution conversion operation or a re-compression operation is carried out on the digital image data.

There remains a need for a method to adjust image capture settings for an electronic image capture device in a burst image capture mode.

SUMMARY OF THE INVENTION

The present invention represents a digital camera for having a variable time duration burst capture mode, comprising:
 an image sensor for capturing a digital image;
 an optical system for forming an image of a scene onto the image sensor;
 a data processing system;
 a frame buffer memory for temporarily storing captured digital images; and
 a program memory communicatively connected to the data processing system and storing instructions configured to cause the data processing system to implement a method for capturing a sequence of digital images in the variable time duration burst capture mode, wherein the instructions include:

specifying a first frame rate;
initiating an image capture sequence;
storing a sequence of digital images captured at the first frame rate in the frame buffer memory;
determining whether the frame buffer memory has been filled to a predetermined capacity, and if so:
specifying a second frame rate, wherein the second frame rate is lower than the first frame rate;
designating a set of stored digital images that can be overwritten; and
storing a sequence of digital images captured at the second frame rate in the frame buffer memory, overwriting the designated set of stored digital images.

This invention has the advantage that a burst image sequence can be captured and stored in a buffer memory having a finite capacity without needing to know the time duration of the burst image sequence at the time that the burst image capture sequence is initiated.

It has the additional advantage that it can be used to capture burst image sequences for difference scenes containing objects at different rates of motion without requiring the user to adjust a frame rate for the burst image sequence according to the rate of motion.

BRIEF DESCRIPTION OF THE DRAWINGS

FIGS. 5A-5E illustrate an example showing the management of a buffer memory during the capture of a burst image sequence according to a preferred embodiment;

FIG. 6 illustrates an example showing the management of a buffer memory during the capture of a burst image sequence according to an alternate embodiment;

FIGS. 9A-9B shows an example where a burst image sequence is used to form a composite panoramic image.

Figure 1B:
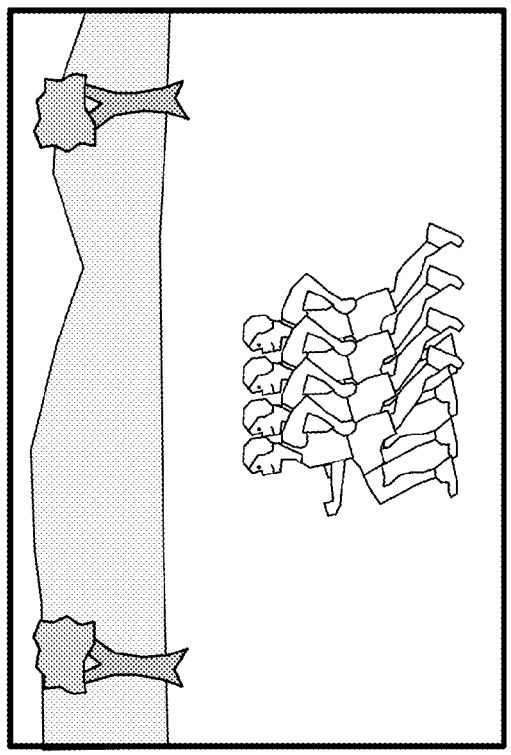
FIG. 1B is an illustration of a composite image captured using a composite burst image capture mode using a sub-optimal time interval.

It is to be understood that the attached drawings are for purposes of illustrating the concepts of the invention and may not be to scale.

DETAILED DESCRIPTION OF THE INVENTION

The present invention represents a digital camera having a variable time duration burst image capture mode. In some embodiments, the burst image capture mode can be used to generate a composite image highlighting a moving object. This invention provides a method for managing buffer memory in a manner such that a user does not need to manually set image capture settings specifying a total time duration for the burst of image captures, thus reducing the number of unacceptable results.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 2:
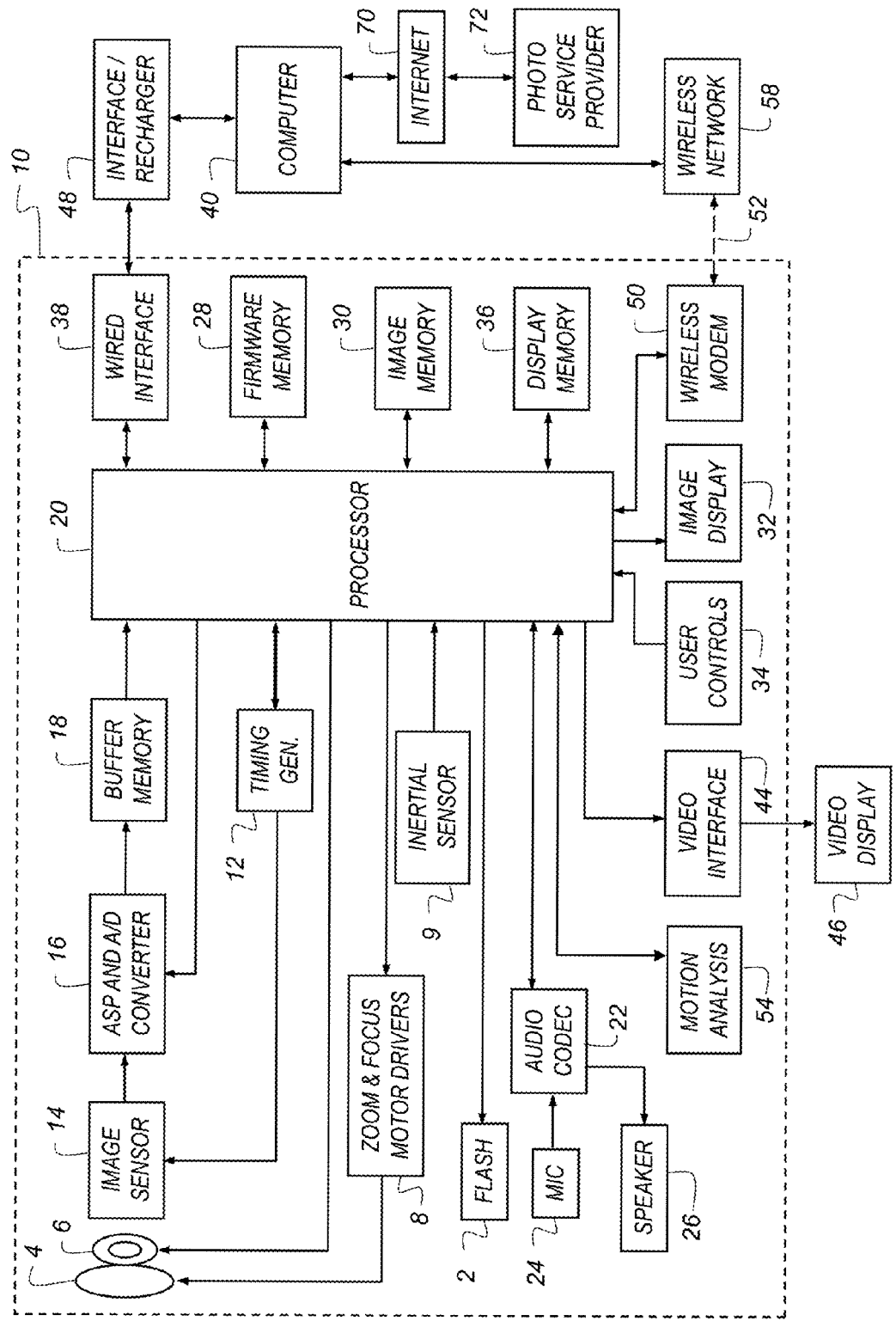
FIG. 2 is a high-level diagram showing the components of a digital camera system.

FIG. 2 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. According to a preferred embodiment, the buffer memory 18 is adapted to store a plurality of captured digital images captured at a sequence of image capture times. As will be described in more detail later, the present invention includes a method to manage the storage of the captured digital images in the buffer memory 18 in order to provide a variable time duration burst capture mode.

The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 2 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is commonly controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor 14 is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

A motion analysis block 54 is used to analyze captured digital images to characterize motion in the scene. Preferably, the motion analysis block 54 uses consecutively captured digital images to determine image motion vectors representing the velocity associated with specific image subject content. In some embodiments, the motion analysis block 54 can be a special purpose processor adapted to determine motion vectors between pairs of digital images. In other embodiments, the motion analysis block 54 can be a process executed by the processor 20. The motion analysis block 54 can use any method known in the art to determine the image motion vectors. In one embodiment, the method for estimating subject motion described in co-pending, commonly assigned U.S. patent application Ser. No. 13/021,067 to Jasinski et al., entitled, "Estimating subject motion between image frames," which is incorporated herein by reference, can be used to determine image motion vectors for one or more objects in the image. Other methods for determining image motion vectors would include the method described by De Haan in U.S. Pat. No. 5,929,919, entitled "Motion-compensated field rate conversion," and the method described by Barjatya in the article "Block matching algorithms for motion estimation" (DIP 6620 final project paper, Utah State University, Spring 2004).

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 2, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1920×1040 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor 14, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the F/# and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene. As described in commonly-assigned, co-pending U.S. patent application Ser. No. 13/021,034 to Jasinski et al., entitled "Estimating subject motion for capture setting determination," the F/# and the exposure time, as well as the flash setting are preferably determined responsive to a detected motion velocity.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, burst image capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera 10 is in a still photography mode the above-described preview mode is initiated when the user partially depresses a shutter button, which is one of the user controls 34, and the still image capture mode is initiated when the user fully depresses the shutter button. The user controls 34 are also used to turn on the digital camera 10, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

In some embodiments, the digital camera 10 includes an inertial sensor 9, which can be used to sense motion of the digital camera 10. The inertial sensor 9 can include one or more motion sensing elements such as gyroscopes or accelerometers.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 3:
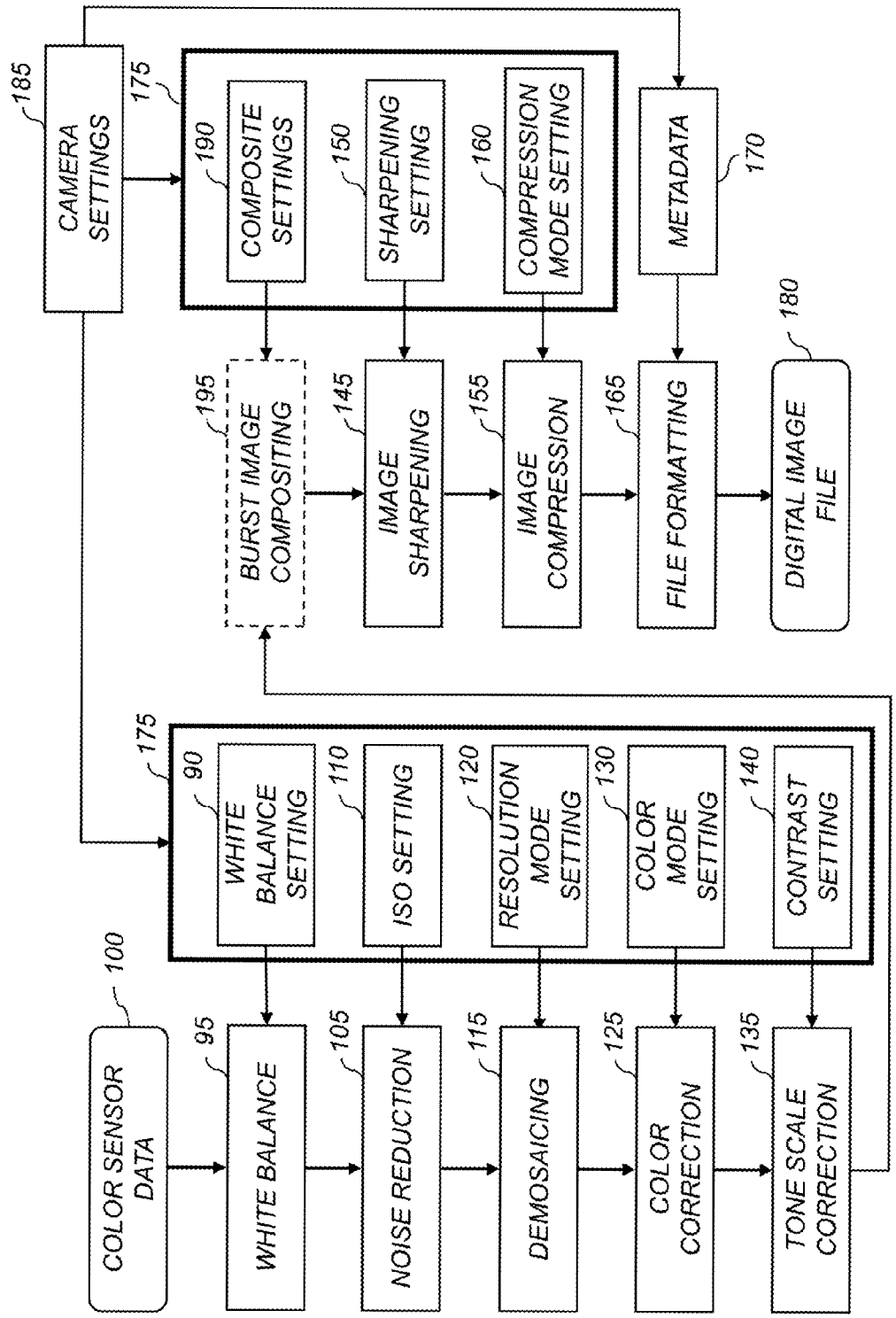
FIG. 3 is a flow diagram depicting typical image processing operations used to process digital images in a digital camera.

FIG. 3 is a flow diagram depicting image processing operations that can be performed by the processor 20 in the digital camera 10 (FIG. 2) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the digital camera 10.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to the ISO setting 110, so that more filtering is performed at higher ISO setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera 10 can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 4,000×3,000 pixels), medium size (e.g. 2,000×1,500 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

When the digital camera 10 is operating in the burst image capture mode, a burst image compositing step 195 can optionally be used to form a composite image according to composite settings 190. This step is shown with a dashed outline reflecting the fact that it is an optional step that is only applied when the user has set the user controls 34 of the digital camera 10 to form a composite image using the burst image capture mode. Using the selected digital images contained within the image buffer 18, specific image scene components within each digital image are combined to form the composite image. Typically, an image background is formed using image content from one or more of the digital images. Then subject image regions corresponding to one or more objects that had transitioned across the image background are extracted from the selected digital images and merged onto the image background. Additional details regarding the capturing of a set of digital images that can be used for the burst image compositing step 195 will be described later.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

When the digital camera 10 is operated in a burst image capture mode, the image sensor 14 is actuated by the timing generator 12 to fill the buffer memory 18 with a set of captured digital images. In some embodiments, the set of captured digital images is then used to form a composite image using the burst image compositing step 195.

Figure 1A:
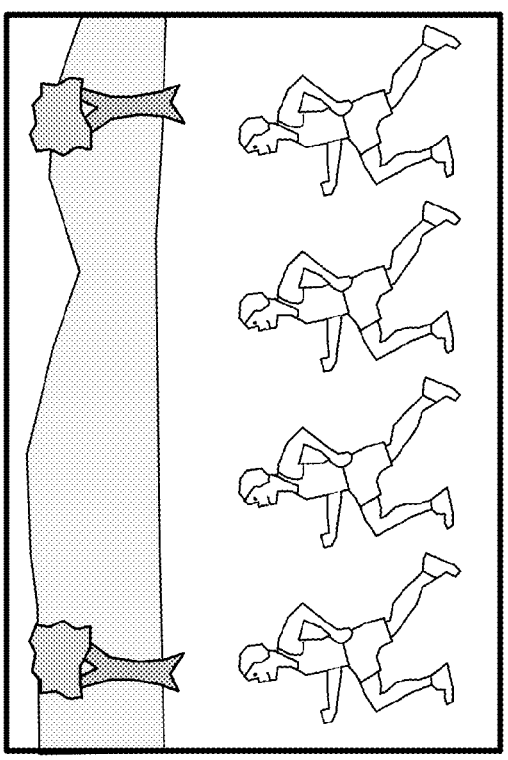
FIG. 1A is an illustration of a composite image captured using a composite burst image capture mode.

The present invention will now be described with reference to FIG. 4. In a preferred embodiment, a variable time duration burst image capture mode is provided by dynamically adjusting the usage of the buffer memory 18 (FIG. 1), together with a frame rate 205. Accordingly, a burst image sequence can be captured having an unknown time duration even though the buffer memory 18 has a capacity to store a finite number of digital images.

When the digital camera 10 is set to operate in the burst capture mode, an initialize frame rate step 200 is used to initialize the frame rate 205 (R) to some initial frame rate, having an associated image capture time interval $\Delta T=1/R$. Typically, the initial frame rate will be the fastest frame rate at which the digital camera 10 (FIG. 2) is able to capture sequential digital images. However, in other embodiments, the initial frame rate can be some other predefined frame rate, or can alternately be selected using appropriate user controls 34 (FIG. 2). The frame rate 205 can be specified using any appropriate units such as "frames/second." Since there is a defined relationship between the frame rate 205 and the corresponding image capture time interval $\Delta T$, it will be recognized that the frame rate can equivalently be specified by designating the image capture time interval $\Delta T$ in appropriate time units (e.g., seconds, or number of clock cycles between successive image captures).

An initiate image capture sequence step 210 is used to initiate the capture of a sequence (i.e., a "burst") of digital images. In a preferred embodiment, the initiate image capture sequence step 210 is triggered by the activation of an image capture control such as a shutter button when the digital camera 10 is set to operate in the burst capture mode. In other embodiments, the initiate image capture sequence step 210 can be triggered by other means. For example, a timer can be used to delay the initiation of the image capture sequence for a defined time delay after the image capture control has been activated. In another embodiment, a stream of preview images can be analyzed and the initiate image capture sequence step 210 can be triggered when a moving object is detected in the scene. In this way, the photographer can be included as a subject in the burst image sequence by setting the digital camera 10 on a tripod and having the initiate image capture sequence step 210 execute automatically when the photographer enters the field of view of the digital camera 10.

A capture digital image step 215 is then used to capture a digital image 225 according to specified image capture settings 220. The image capture settings 225 would include various settings such as an exposure time setting, a lens aperture setting, an ISO setting or an image resolution setting.

The captured digital image 225 is to be stored in buffer memory 18 (FIG. 2). However, the buffer memory 18 will only be able to store a finite number of captured digital images 225. Therefore, depending on the time duration of the burst image sequence, the buffer memory 18 may become filled. A buffer full test 230 is used to determine whether the buffer memory 18 has been filled to a predetermined capacity. In a preferred embodiment, the predetermined capacity corresponds to there not being enough room to store any additional digital images 225 in the buffer memory 18. For example, the buffer memory 18 may have capacity to store eight images. In this case, if the buffer memory 18 has eight images stored in it, the buffer full test 230 would indicate that the buffer memory 18 is full.

If the buffer full test 230 determines that the buffer memory 18 is not full, a store digital image step 235 is used to store the captured digital image 225 in the next available location in the buffer memory 18. On the other hand, if the buffer full test 230 determines that the buffer memory 18 is full then a series of steps are used to free up some of the buffer memory 18 so that the time duration of the burst image sequence can be extended. As will be described in more detail later, in a preferred embodiment, the buffer memory 18 is freed up by designating a set of stored digital images that can be overwritten rather than by actually deleting anything from the buffer memory.

A modify frame rate step 240 is used to modify the frame rate 205. In a preferred embodiment, the frame rate 205 is adjusted so that the new frame rate is reduced by a factor of 2× relative to the previous frame rate (R'=R/2). The associated image capture time interval $\Delta T$ between successive image captures is accordingly doubled ($\Delta T'=2\Delta T$). In other embodiments, the new frame rate can be reduced by some other integer multiple besides two (e.g., it can be reduced by a factor of 3× or 4×). In some embodiments, the frame rate 205 can even be reduced by a non-integer factor. However, in this case the stored digital images may not contain frames having capture times that correspond exactly to the new frame rate 205.

A designate frames to overwrite step 245 is used to designate a set of the previously stored digital images that are stored in the buffer memory 18 (FIG. 2) that can be overwritten. The remaining stored digital images are designated to be retained. In a preferred embodiment, any stored digital images having image capture times not corresponding to the new frame rate 205 are designated as stored digital images that can be overwritten. For example, if the new frame rate is reduced by a factor of two relative to the previous frame rate, then every other digital image in the burst image capture sequence (i.e., either the even-numbered digital images or the odd-numbered digital images) can be designated to be overwritten In some embodiments, the stored digital images that are designated to be overwritten can be deleted from the buffer memory 18, but generally it will be preferable to simply overwrite the old image data with new image data as new images are captured.

An optional update sequence numbers step 250 is then used to renumber the digital images that are not designated to be overwritten. Execution then proceeds to the store digital image step 235. If the current digital image 225 is designated to be retained, it is stored using the store digital image step 235. Otherwise, this step is skipped and execution can proceed to done test 255.

An example showing management of the buffer memory 18 (FIG. 2) during the capture of a burst image sequence is illustrated in FIGS. 5A-5E. In this example, the buffer memory 18 can store eight digital images in corresponding buffer memory areas that will be referred to as frames #1-#8. As illustrated in FIG. 5A, a first set of eight digital images are captured using an image capture time interval of $\Delta T$ and are stored in corresponding frames of the buffer memory 18.

At this point, the buffer full test 230 (FIG. 4) determines that the buffer memory 18 has been filled to capacity. The modify frame rate step 240 (FIG. 4) then updates the frame rate 205 (FIG. 4) by reducing it by a factor of two. The new image capture time interval will therefore be $2\Delta T$.

The designate frames to overwrite step 245 (FIG. 4) designates any stored digital images that were not captured at image captured times corresponding to the new frame rate 205 (FIG. 4) to be overwritten. In this case, frames #1, #3, #5 and #7 were captured at image capture times that are consistent with the new frame rate 205, and they are therefore designated to be kept. Accordingly, frames #2, #4, #5 and #8 were captured at image capture times that are not consistent with the new frame rate 205, and they are therefore designated to be overwritten. The update sequence numbers step 250 (FIG. 4) is then used to renumber the frames that are to be kept. FIG. 5B shows the status of the buffer memory 18 following these operations. The frames that are available to be overwritten are designated as being "open" in this figure.

As additional images are captured according to the new image capture time interval ($2\Delta T$), they are stored in the buffer memory 18 (FIG. 2) in the open slots that have been designated as being available to be overwritten. FIG. 5C shows the status of the buffer memory 18 after four more digital images have been captured and stored. It can be seen that frame #2 of the buffer memory now contains a digital image 225 (FIG. 4) captured at an image capture time of $8\Delta T$, having a corresponding image sequence #5. Likewise, frames #4, #6 and #8 contain digital images 225 that were captured at image capture times of $10\Delta T$, $12\Delta T$ and $14\Delta T$, respectively. Note that the designated frames can be overwritten in different orders in various embodiments. For example, in some embodiments, the first frame that is overwritten is the most recently captured of the frames that were designated to be overwritten.

At this point, the buffer full test 230 (FIG. 4) again determines that the buffer memory 18 has been filled to capacity. The modify frame rate step 240 (FIG. 4) then updates the frame rate 205 (FIG. 4) by again reducing it by another factor of two. The new image capture time interval will therefore be $4\Delta T$.

The designate frames to overwrite step 245 (FIG. 4) designates any stored digital images that were not captured at image captured times corresponding to the new frame rate 205 (FIG. 4) to be overwritten. In this case, frames #1, #2, #5 and #6 were captured at image capture times that are consistent with the new frame rate 205, and they are therefore designated to be kept. Accordingly, frames #3, #4, #7 and #8 were captured at image capture times that are not consistent with the new frame rate 205, and they are therefore designated to be overwritten. The update sequence numbers step 250 (FIG. 4) is then used to renumber the frames that are to be kept. FIG. 5D shows the status of the buffer memory 18 following these operations.

As additional images are captured according to the new image capture time interval ($4\Delta T$), they are stored in the buffer memory 18 (FIG. 2) in the open slots that have been designated as being available to be overwritten. FIG. 5E shows the status of the buffer memory 18 after four more digital images have been captured and stored. It can be seen that frame #3 of the buffer memory now contains a digital image 225 (FIG. 4) captured at an image capture time of $16\Delta T$, having a corresponding image sequence #5. Likewise, frames #4, #7 and #8 contain digital images 225 that were captured at image capture times of $20\Delta T$, $24\Delta T$ and $28\Delta T$, respectively. This process will continue indefinitely until the burst image capture sequence is terminated.

In some embodiments, the predetermined capacity considered by the buffer full test 230 corresponds to less than a totally full buffer memory 18 (FIG. 2). For example, while digital images 225 are being captured at the initial frame rate 205, the buffer full test 230 can check to see whether the buffer memory 18 has reached half of its maximum capacity. If so, the buffer memory 18 is designated to have been filled to the predetermined capacity. The modify frame rate step 240 is then used to determine a new reduced frame rate 205 as described earlier. However, in this case, it is not necessary to mark any frames for deletion since there is still additional capacity in the buffer memory 18. Rather, additional digital images 225 can continue to be captured and stored in the buffer memory 18 according to the new frame rate 205. The predetermined capacity can then be adjusted so that the buffer full test 230 will now compare the fullness of the buffer memory 18 to a new predetermined capacity (e.g., ¾ of the maximum capacity). If the digital images stored in the buffer memory 18 is then determined to exceed the new predetermined capacity, the frame rate 205 can be reduced even further. In this case, the individual digital images in the burst image capture sequence will not be spaced by a uniform time interval.

An example showing management of the buffer memory 18 (FIG. 2) during the capture of a burst image sequence using this approach is illustrated in FIG. 6. In this case, four digital images are captured using an initial frame rate 205 (FIG. 4) having a corresponding image capture time interval of $\Delta T$. At this point, the buffer memory 18 is determined to have been filled to the predetermined capacity (50%) and the frame rate 205 is adjusted so that additional digital images are captured using an image capture time interval of $2\Delta T$. A new predetermined capacity of 75% is then assigned for use with the buffer full test 230 (FIG. 4). The image frames numbered #5 and #6 are then captured using the new frame rate 205. At this point, the buffer memory 18 is determined to have been filled to the new predetermined capacity (75%) and the frame rate 205 is adjusted again so that additional digital images are captured using an image capture time interval of $4\Delta T$. A new predetermined capacity of 100% is then assigned for use with the buffer full test 230. The image frames numbered #7 and #8 are then captured using the new frame rate 205. At this point, the buffer full test 230 determines that the buffer memory 18 is full to 100% of its capacity. Since there is no room to store additional digital images, either the burst image capture sequence can be terminated, or some of the stored digital images can be designated to be overwritten as was described earlier.

Figure 4:
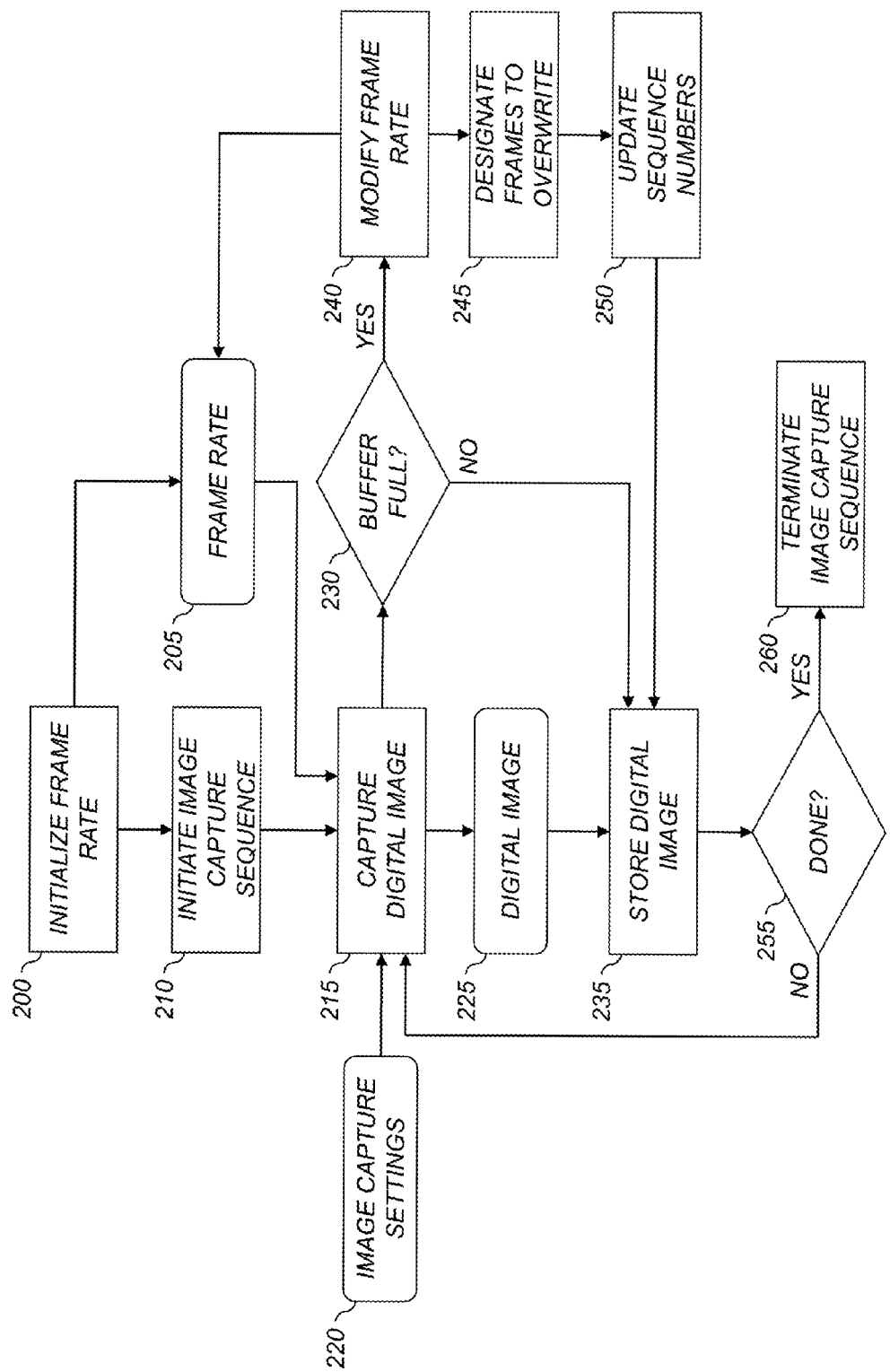
FIG. 4 is a flow chart showing a method for capturing a burst image sequence according to a preferred embodiment.

Returning to a discussion of FIG. 4, after each digital image 225 has been captured and stored in the buffer memory 18 (FIG. 2), a done test 255 is used to determine whether the burst image capture sequence should be terminated. The done test 255 can use a variety of different methods to determine whether or not the burst image capture sequence should be terminated. In a preferred embodiment, the burst image capture sequence is initiated when the user presses an image capture button on the digital camera 10, and is terminated when the user releases the image capture button. In this case, the done test 255 checks the status of the image capture button, and if the image capture button is still depressed, execution returns to the capture digital image step 215 where the next digital image 225 is captured at an image capture time determined according to the frame rate 205. If the image capture button has been released, the done test 255 passes control to a terminate image capture sequence step 260. The terminate image capture sequence step 260 terminates the capture of any additional digital images, and will generally initiate processing of the digital images stored in the buffer memory 18 according to the processing steps described earlier with respect to FIG. 3. In some embodiments, after the digital images have been processed, each of the processed digital images in the burst image capture sequence is stored in a separate digital image file in the image memory 30 (FIG. 2). For example, the processed digital images can be stored in JPG files using the well-known EXIF digital image file format. As will be described in more detail later, in other embodiments, the individual digital images can be combined to form a composite image, or stored in some other fashion.

In other embodiments, the done test 255 can use other methods to determine whether or not the burst image capture sequence should be terminated. For example, in some embodiments a maximum time duration for the burst image capture sequence is specified. If the maximum time duration has been reached, the burst image capture sequence is terminated even if the user has not released the image capture control. This provides a "backup" method for terminating the burst image capture sequence if the time duration is extended beyond a reasonable length.

As described earlier, in some embodiments the digital camera 10 includes motion analysis block 54 which can be used to analyze captured digital images to characterize motion in the scene, for example by determining a rate of motion for at least one moving object in the scene. In a preferred embodiment, the rate of motion is an image motion vector giving a direction and a magnitude of the object motion. The motion analysis block 54 can use any method known in the art to determine the rate of motion, such as the method for estimating subject motion described in the aforementioned U.S. patent application Ser. No. 13/021,067, entitled "Estimating subject motion between image frames." In other embodiments, the motion analysis block 54 determines the position of the moving object in each captured digital image rather than the rate of motion. If desired, a rate of motion can subsequently be determined based on a difference between the position of the moving object in successive digital images.

In a preferred embodiment, the motion analysis block 54 determines the rate of motion for a moving foreground object in the scene. In some instances, the motion analysis block 54 may detect a plurality of moving foreground objects in the scene. In such cases, a number of different strategies can be used to determine the rate of motion. For example, the rate of motion can be determined for the fastest moving object, or the moving object nearest to the center of the frame. In some embodiments, the rates of motion for the plurality of moving foreground objects can be combined to determine a combined rate of motion. For example, a weighted average of the magnitudes of the rates of motion can be computed. The weights used for the weighted average can be determined in a variety of ways. For example, they can be a function of the size or the position of the moving objects.

In some embodiments, a main subject detection algorithm can be used to identify a main subject in the scene. If the main subject corresponds to one of the moving objects, the rate of motion can then be determined based on the main subject. Any method for detecting the main subject known in the art can be used to identify the main subject. Main subject detection algorithms are well-known in the art. One example of a main subject detection algorithm that can be used in accordance with the present invention is described in U.S. Pat. No. 6,282,317 to Luo et al., entitled "Method for automatic determination of main subjects in photographic images," which is incorporated herein by reference.

For cases where the digital camera includes motion analysis block 54, the determined motion characteristics for the scene can be used by the done test 255 (FIG. 4) to terminate the burst image capture sequence in some embodiments. For example, if the burst capture mode is used to capture a sequence of digital images for a scene including a moving foreground object in front of a background, the done test 255 can terminate the image capture sequence when the moving the foreground object exits a field of view of the camera. Once the moving object is no longer contained in the captured digital images, it can be assumed that there is no longer any value in extending the burst image capture sequence.

Figures 7A, 7B:
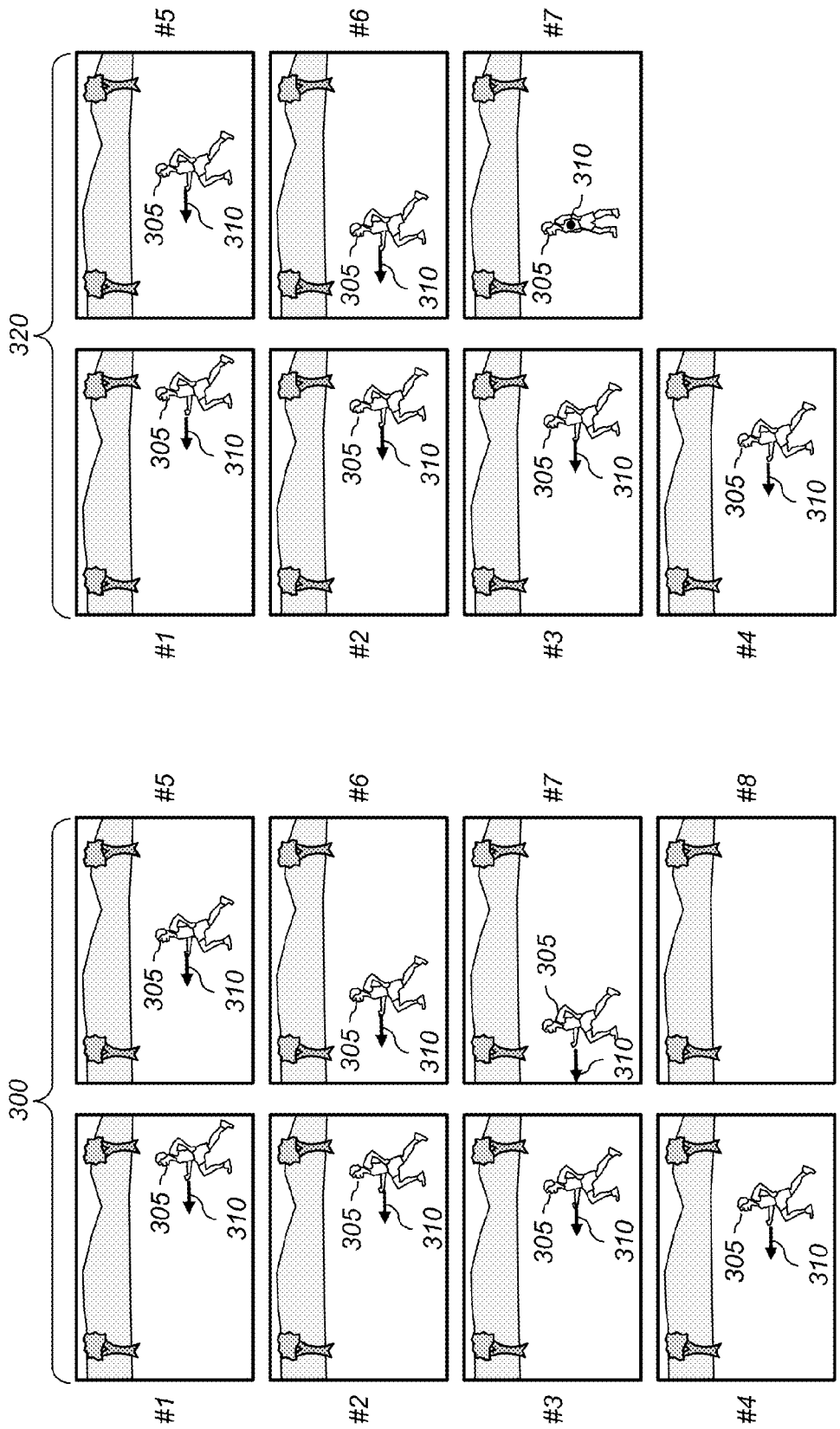
FIG. 7A shows an example of a burst image sequence which is terminated when a moving object exits the field of view of the digital camera.
FIG. 7B shows an example of a burst image sequence when no motion is detected within the field of view of the digital camera.

FIG. 7A illustrates an example of this scenario. A digital image sequence 300 is captured having eight digital images (labeled #1-#8). The scene contains a moving foreground object 305. The motion analysis block 54 determines a position of the moving foreground object 305, as well as a corresponding rate of motion 310 for each successive digital image. When digital image #8 is captured, the motion analysis block 54 determines that the moving foreground object 305 has exited the field of view of the camera and the burst image capture sequence is accordingly terminated. In some embodiments, only the digital images that contain the moving foreground object 305 (e.g., digital images #1-#7) are retained. In other embodiments, digital image #8 can be retained as well.

In another embodiment, the done test 255 can terminate the image capture sequence when the motion analysis block 54 detects no substantial object motion. This would correspond to the case where the moving foreground objects have either stopped moving or have exited the image frame. A foreground object can be determined to have stopped moving if its rate of motion falls below some specified threshold value. Once the object motion has ceased, it can be assumed that there is no longer any value in extending the burst image capture sequence.

FIG. 7B illustrates an example of this scenario. A digital image sequence 320 is captured having seven digital images (labeled #1-#7). The scene contains a moving foreground object 305. The motion analysis block 54 determines a position of the moving foreground object 305, as well as a corresponding rate of motion 310 for each successive digital image. When digital image #7 is captured, the motion analysis block 54 determines that the moving foreground object 305 has stopped moving and the burst image capture sequence is accordingly terminated. In some embodiments, only the digital images where the moving foreground object 305 is moving (e.g., digital images #1-#6) are retained. In other embodiments, digital image #7 can be retained as well.

Figure 8B:
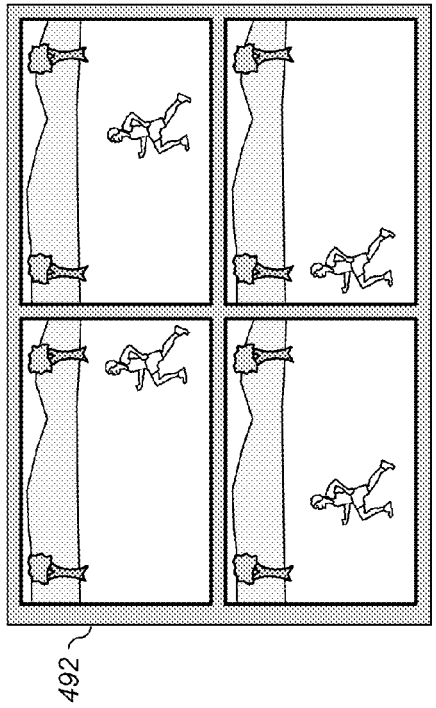
FIGS. 8A-8C show examples of composite images formed using a composite burst mode in accordance with various embodiments.
Figure 8C:
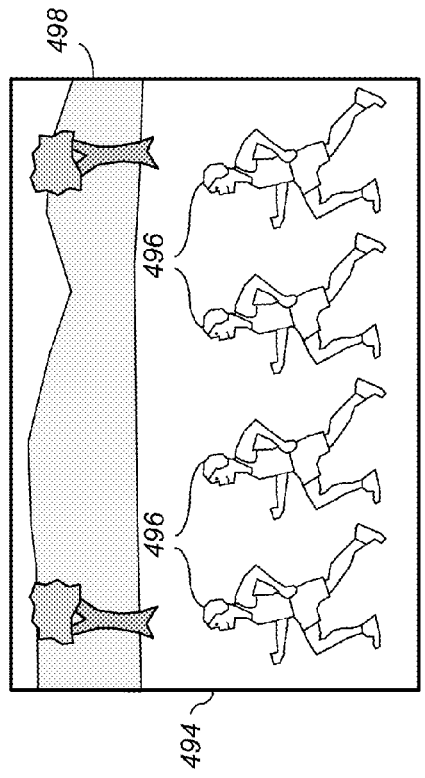
Figure 8A:
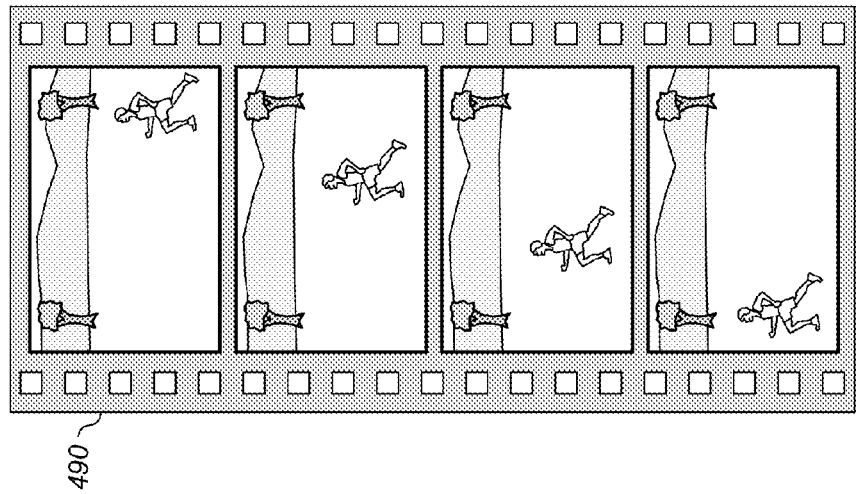

As mentioned earlier with reference to FIG. 3, in some embodiments the burst image compositing step 195 can be used to form a composite image from the set of captured digital images in the burst image capture sequence. The composite image can be formed using any method known in the art. In one embodiment, the composite image is a montage image formed by inserting some or all of the digital images in the burst image capture sequence into a template so that they can be viewed together. FIG. 8A shows an example of a montage composite image 490 using a "film strip" template for a burst image capture sequence containing four digital images. Similarly, FIG. 8B shows an example of a montage composite image 492 using a 2×2 rectangular template.

In other embodiments, the composite image is formed by extracting the moving object from each of the digital images in the burst image capture sequence and combining them onto a common background image. In one embodiment this can be done as described in commonly-assigned U.S. Pat. No. 7,024,054 "Method and system for generating a foreground mask for a composite image" to Cahill, et al., which is incorporated herein by reference. Other methods for identifying the boundaries of the moving object and extracting the moving object from the digital image are well-known in the art. Such methods typically work by aligning the backgrounds in the digital images, then computing differences between the aligned sequential digital images to identify the regions where there was movement. In some embodiments, the background from one of the digital images in the burst image capture sequence can be used as the common background image. In other embodiments, the backgrounds from a plurality of the digital images can be combined (e.g., by averaging them to remove noise) to form the common background image. FIG. 8C shows an example of a composite image 494 of this type where a moving object 496 is extracted from a plurality of digital images and combined with a common background image 498.

In the examples that have been discussed thus far, the burst image capture mode is used to capture a burst image capture sequence while holding the digital camera 10 in a stationary position to capture a sequence of digital images of a scene containing a moving object on a stationary background. In other cases, the burst image capture mode can be used to capture a sequence of digital images for a stationary scene while panning the digital camera 10 to capture a series of different fields of view. In this case, the digital images in the stored sequence of digital images can be combined to form a composite image corresponding to a panoramic image of the scene.

FIG. 9A shows an example where a burst image capture sequence is captured of a scene 500 using to the method of the present invention. In this case, the digital camera 10 is operated in a burst image capture mode and is panned across the scene 500 while holding down the image capture button. As was described with respect to FIG. 4, if the buffer memory 18 (FIG. 2) is determined to have been filled to a predetermined capacity during the process of capturing the burst image capture sequence, the frame rate 205 is modified using the modify frame rate step and some of the stored digital images are designated that can be overwritten using the designate frames to overwrite step 245. In the example, the final burst image capture sequence contains four digital images 505 having overlapping fields of view.

FIG. 9B shows an example of a composite panoramic image 510 formed by combining the four digital images 505 from FIG. 9A. Methods for combining a plurality of digital images 505 to form a composite panoramic image 510 are well-known in the art. Most methods involve aligning the individual digital images 505 by analyzing the overlapping portions of the digital images. The composite panoramic image 510 is then formed by using appropriate portions of each of the individual digital images 505. In the image regions where two (or more) of the individual digital images 505 overlap, a weighted average of the corresponding pixel values for the individual digital images 505 can be used to determine the pixel values for the composite panoramic image 510. Typically, weights for the weighted average are tapered across the overlap region to provide a smooth transition between the individual digital images 505.

In other embodiments, the stored sequence of digital images in the burst image capture sequence can be combined to form a video sequence having a temporal sequence of image frames. The video sequence can be useful to provide an impression of the motion in the scene. The video sequence can be stored using any video file format known in the art such as the well-known MPEG 2, MPEG 4 or motion JPEG video file formats.

In one embodiment, each of the individual digital images in the burst image capture sequence is repeated for a predetermined number of image frames. The number of repeated image frames will determine the apparent rate of motion of the moving objects. In some cases, the number of repeated image frames can be selected to provide realistic apparent rate of motion. For example, if the final frame rate 205 (FIG. 4) for the burst image capture sequence is 5 frames/second, and if the video sequence is intended to be played at 30 frames/second, then each of the individual digital images can be repeated six times to provide a realistic apparent rate of motion. The apparent rate of motion can be increased or decreased by adjusting the number of repeated image frames accordingly. In some embodiments, a transition can be provided between the individual image frames rather than abruptly transitioning from one to the other. For example, a cross fade transition can be used so that the individual frames appear to smoothly fade from one to the other.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
9 inertial sensor
10 digital camera
12 timing generator
14 image sensor
16 ASP and A/D Converter
18 buffer memory
20 processor
22 audio codec
24 microphone
25 pressure sensor
26 speaker
28 firmware memory
30 image memory
32 image display
34 user controls
36 display memory
38 wired interface
40 computer
42 tilt sensor
44 video interface
46 video display
48 interface/recharger
50 wireless modem
52 radio frequency band
54 motion analysis block
58 wireless network
70 Internet
72 photo service provider
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 photography mode settings
180 digital image file
185 camera settings
190 composite settings
195 burst image compositing step
200 initialize frame rate step
205 frame rate
210 initiate image capture sequence step
215 capture digital image step
220 image capture settings
225 digital image
230 buffer full test
235 store digital image step
240 modify frame rate step
245 designate frames to overwrite step
250 update sequence numbers step
255 done test
260 terminate image capture sequence step
300 digital image sequence
305 moving foreground object
310 rate of motion
320 digital image sequence
490 montage composite image
492 montage composite image
494 composite image
496 moving object
498 background image
500 scene
505 digital image
510 composite panoramic image

The invention claimed is:

1. A digital camera comprising:
an image sensor for capturing a digital image;
an optical system for forming an image of a scene onto the image sensor;
a data processing system;
a frame buffer memory for temporarily storing captured digital images; and
a program memory communicatively connected to the data processing system and storing instructions configured to cause the data processing system to implement a method for capturing a sequence of digital images in a variable time duration burst capture mode, wherein the method includes:
specifying a first frame rate;
initiating an image capture sequence;
storing a first plurality of digital images captured at the first frame rate in the frame buffer memory;
determining whether the frame buffer memory has been filled to a predetermined capacity, and if so:
specifying a second frame rate, wherein the second frame rate is lower than the first frame rate;

identifying one or more of the first plurality of digital images as a first set of digital images that can be overwritten;

storing a second plurality of digital images captured at the second frame rate in the frame buffer memory, overwriting one or more of the identified first set of digital images; and numbering the first plurality of digital images stored in the frame buffer and/or the second plurality of digital images stored in the frame buffer in response to the overwriting.

2. The digital camera of claim 1 wherein the image capture sequence is initiated by pressing an image capture button, and wherein the image capture sequence is terminated when the image capture button is released.

3. The digital camera of claim 1 wherein the image capture sequence is terminated after a maximum time duration.

4. The digital camera of claim 1 wherein the instructions to implement the method for capturing a sequence of digital images in the variable time duration burst capture mode further include processing one or more of the sequence of digital images using one or more image processing operations to form processed digital images.

5. The digital camera of claim 1 wherein the instructions to implement the method for capturing a sequence of digital images in the variable time duration burst capture mode further include storing each of one or more of the sequence of digital images in an image memory as individual image files.

6. The digital camera of claim 1 wherein the instructions to implement the method for capturing a sequence of digital images in the variable time duration burst capture mode further include:

combining a plurality of the sequence of digital images to form a composite digital image; and storing the composite digital image in an image memory.

7. The digital camera of claim 6 wherein the composite digital image comprises an image formed by combining foreground objects from a plurality of the sequence of digital images onto a common image background.

8. The digital camera of claim 6 wherein the composite digital image comprises a panoramic image.

9. The digital camera of claim 1 wherein the instructions to implement the method for capturing a sequence of digital images in the variable time duration burst capture mode further include combining two or more images from the sequence of digital images to form a video sequence.

10. The digital camera of claim 1 wherein the first frame rate is an integer multiple of the second frame rate.

11. The digital camera of claim 10 wherein any stored digital image having a capture time not corresponding to the second frame rate are identified as a member of the first set of digital images that can be overwritten.

12. The digital camera of claim 10 wherein:
the first frame rate is double the second frame rate;
the first plurality of digital images comprise even-numbered and odd-numbered digital images; and
one of the even-numbered digital images and one of the odd-numbered digital images are identified as members of the first set of digital images that can be overwritten.

13. The digital camera of claim 1 wherein the instructions to implement the method for capturing a sequence of digital images in the variable time duration burst capture mode further include:

determining whether the frame buffer memory has been filled to the predetermined capacity while digital images are being captured at the second frame rate, and if so:
specifying a third frame rate;

identifying one or more of the digital images comprising the sequence of digital images as a second set of images that can be overwritten; and storing a third plurality of digital images captured at the third frame rate in the frame buffer memory, overwriting at least one of the identified second set of digital images.

14. A method for capturing an image sequence having a variable time duration for storage in a frame buffer memory having a predetermined capacity, comprising:

specifying a first frame rate;
initiating an image capture sequence;
capturing a first plurality of digital images at the first frame rate;
storing the first plurality of digital images in the frame buffer memory;
determining whether the frame buffer memory has been filled to a predetermined capacity, and if so:
specifying a second frame rate, wherein the second frame rate is lower than the first frame rate;
identifying one or more of the first plurality of digital images as a first set of digital images that can be overwritten;
capturing a second plurality of digital images at the second frame rate;
storing the second plurality of digital images in the frame buffer memory, overwriting one or more of the identified first set of digital images; and
numbering the first plurality of digital images stored in the frame buffer and/or the second plurality of digital images stored in the frame buffer in response to the overwriting.

15. A non-transitory program storage device comprising instructions stored thereon to cause one or more processors to:

set a first image capture frame rate;
initiate an image capture sequence;
capture a first plurality of digital images at the first frame rate;
store the first plurality of digital images in a frame buffer memory;
determine whether the frame buffer memory has been filled to a predetermined capacity, and if so:
specify a second frame rate, wherein the second frame rate is lower than the first frame rate;
identify one or more of the first plurality of digital images as a first set of digital images that can be overwritten;
capture a second plurality of digital images at the second frame rate;
store the second plurality of digital images in the frame buffer memory, overwriting one or more digital images of the identified first set of digital images; and
number the first plurality of digital images stored in the frame buffer memory and/or the second plurality of digital images stored in the frame buffer memory in response to the overwriting.

16. The non-transitory program storage device of claim 15, further comprising instructions to cause the one or more processors to:

combine one or more of the digital images in the frame buffer memory to form a composite digital image; and
store the composite digital image in a memory.

17. The non-transitory program storage device of claim 16, further comprising instructions to cause the one or more processors to combine a plurality of digital images in the frame buffer memory to form a video sequence.

18. The non-transitory program storage device of claim 15, wherein the first image capture frame rate is an integer multiple of the second image capture frame rate.

19. The non-transitory program storage device of claim 15, wherein any digital image stored in the memory having an image capture time not corresponding to the second image capture frame rate are identified as a member of the first set of digital images that can be overwritten.

* * * * *